(12) United States Patent
Ueda (10) Patent No.: US 11,807,145 B2
(45) Date of Patent: Nov. 7, 2023

(54) HEADREST LEVEL ADJUSTMENT MECHANISM

(71) Applicant: TOYOTA JIDOSHA KABUSHIKI KAISHA, Aichi-ken (JP)

(72) Inventor: Katsuya Ueda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 10 days.

(21) Appl. No.: 17/568,728

(22) Filed: Jan. 5, 2022

(65) Prior Publication Data
US 2022/0219585 A1    Jul. 14, 2022

(30) Foreign Application Priority Data

Jan. 14, 2021   (JP) .................................. 2021-004522

(51) Int. Cl.
*B60N 2/897*   (2018.01)
*B60N 2/818*   (2018.01)

(52) U.S. Cl.
CPC ............. *B60N 2/897* (2018.02); *B60N 2/818* (2018.02)

(58) Field of Classification Search
CPC ..................................................... B60N 2/897
See application file for complete search history.

(56) References Cited

U.S. PATENT DOCUMENTS

| | | | |
|---|---|---|---|
| 6,969,118 B2 | 11/2005 | Yamada | |
| 2002/0043832 A1* | 4/2002 | Watanabe | B60N 2/809 |
| | | | 297/216.13 |
| 2005/0280305 A1 | 12/2005 | Gurtatowski et al. | |
| 2011/0248540 A1 | 10/2011 | Yamada et al. | |
| 2015/0048664 A1* | 2/2015 | Sano | B60N 2/818 |
| | | | 297/391 |
| 2020/0130549 A1* | 4/2020 | Izumida | B60N 2/809 |

FOREIGN PATENT DOCUMENTS

| | | |
|---|---|---|
| DE | 19628861 A1 | 1/1998 |
| DE | 10149455 A1 | 4/2003 |
| EP | 3366512 A1 | 8/2018 |
| JP | 2010136770 A | 6/2010 |
| KR | 1998030607 U | 8/1998 |

OTHER PUBLICATIONS

Extended European Search Report in EP Application No. 22150407.9, dated May 20, 2022, 9pp.

* cited by examiner

*Primary Examiner* — David R Dunn
*Assistant Examiner* — Tania Abraham
(74) *Attorney, Agent, or Firm* — HAUPTMAN HAM, LLP (57) ABSTRACT

A headrest level adjustment mechanism includes a main support that is provided on a side of a main headrest stay, and cooperates with the main headrest stay to provide a locking mechanism that adjusts a level of the headrest and locks the headrest at a predetermined level, and a sub support that is provided on a side of a sub headrest stay, and cooperates with the sub headrest stay to provide a movement restriction mechanism that restricts downward movement of the headrest and keeps the headrest at a lowest-level position, in a condition where the main headrest stay is engaged with the main support, and a gap is provided between the headrest and a seat back, the main headrest stay and the sub headrest stay being held by the seat back and hanging down from two positions of the headrest spaced from each other in a seat width direction.

9 Claims, 9 Drawing Sheets

HEADREST LEVEL ADJUSTMENT MECHANISM

CROSS-REFERENCE TO RELATED APPLICATION

This application claims priority to Japanese Patent Application No. 2021-004522 filed on Jan. 14, 2021, incorporated herein by reference in its entirety.

BACKGROUND

1. Technical Field

The present disclosure relates to a headrest level adjustment mechanism.

2. Description of Related Art

Japanese Unexamined Patent Application Publication No. 2010-136770 (JP 2010-136770 A) discloses a technology concerning a locking mechanism of a headrest support that is engaged with a headrest stay. When an unlocking knob provided on the headrest support is pressed, to press the headrest downward, the headrest can be lowered until a lower surface of the headrest abuts against an upper surface of a seat back. Namely, according to the related art, the headrest is placed at the lowest-level position when it abuts against the seat back.

SUMMARY

Generally, the headrest is formed of foam, such as urethane foam, and can be elastically deformed. Thus, a dimension of the headrest measured in the vehicle vertical direction varies due to the elastic deformation. Accordingly, when the position at which the headrest abuts against the seat back is specified as the lowest level of the headrest, the lowest level of the headrest is set in view of the variation in the dimension, and the size of the headrest is increased accordingly.

This present disclosure provides a headrest level adjustment mechanism that can make a headrest small-sized, while assuring the level of the headrest that is required at the lowest-level position of the headrest.

A headrest level adjustment mechanism for a headrest according to one aspect of the present disclosure includes a main support that is provided on a side of the main headrest stay, and cooperates with the main headrest stay to provide a locking mechanism operable to adjust a level of the headrest provided above a seat back and lock the headrest at a predetermined level, the main headrest stay being held by the seat back and hanging down from a first position of the headrest; and a sub support that is provided on a side of the sub headrest stay, and cooperates with the sub headrest stay to provide a movement restriction mechanism operable to restrict downward movement of the headrest at a lowest-level position at which the headrest is located at a lowest level, in a condition where the main headrest stay is engaged with the main support, and a gap is provided between the headrest and the seat back, and keep the headrest at the lowest-level position, the sub headrest stay being held by the seat back and hanging down from a second position of the headrest that is spaced from the first position in a seat width direction.

The headrest level adjustment mechanism according to the above aspect includes the main support and the sub support. The main headrest stay and the sub headrest stay hang down from left and right sections (in the seat width direction) of the headrest provided above the seat back, and the headrest stays are held by the seat back.

The main support is provided on the main headrest stay side, and cooperates with the main headrest stay to provide the locking mechanism operable to adjust the level of the headrest and lock the headrest at the predetermined level. On the other hand, the sub support is provided on the sub headrest stay side, and cooperates with the sub headrest stay to provide the movement restriction mechanism operable to restrict the downward movement of the headrest.

Here, the movement restriction mechanism restrict the downward movement of the headrest (namely, place the headrest in a so-called locked state) and keep the headrest at the lowest-level position at which the headrest is located at the lowest level, in a condition where the main headrest stay is engaged with the main support, and a gap is provided between the headrest and the seat back.

According to the above aspect, the gap is provided between the headrest and the seat back, at the lowest-level position of the headrest, so that the size of the headrest as measured in the height direction can be reduced by the amount corresponding to the gap, where the headrest has the same lowest-level position, as compared with the case where no gap is provided between the headrest and the seat back.

The headrest level adjustment mechanism according to the above aspect has an excellent effect that the size of the headrest can be reduced, while assuring the level of the headrest that is required at the lowest-level position of the headrest.

In the headrest level adjustment mechanism according to the above aspect, the locking mechanism may include a plurality of main notches included in the main headrest stay and arranged in a hanging direction of the main headrest stay, and a main lock part provided in the main support and configured to engage with one of the main notches to restrict upward and downward movement of the main headrest stay.

In the headrest level adjustment mechanism as described above, the locking mechanism may include the main notches and the main lock part. The main notches may be included in the main headrest stay, and be arranged in the hanging direction of the main headrest stay (in the height direction of the headrest). On the other hand, the main lock part may be provided in the main support, and the main lock part may be engaged with one of the main notches included in the main headrest stay, so that the upward and downward movement of the main headrest stay (the headrest) is restricted (in the locked state).

The headrest level adjustment mechanism as described above has an excellent effect that the upward and downward movement of the main headrest stay can be restricted with a simple arrangement.

In the headrest level adjustment mechanism as described above, the main notches may include a first notch that may set the headrest at the lowest-level position, and the movement restriction mechanism may include a sub notch included in the sub headrest stay at the same level as the first notch, and a sub lock part provided in the sub support and configured to engage with the sub notch to restrict downward movement of the sub headrest stay.

In the headrest level adjustment mechanism as described above, the movement restriction mechanism may include the sub notch and the sub lock part. The sub notch may be included in the sub headrest stay at a position having the same level as the first notch as one of the main notches that may set the headrest at the lowest-level position. On the other hand, the sub lock part may be provided in the sub support, and be engaged with the sub notch to restrict the downward movement of the sub headrest stay (in the locked state).

Namely, when the headrest is at the lowest-level position, the main lock part of the locking mechanism may engage with the main notch, to restrict the downward movement of the main headrest stay, and the sub lock part of the movement restriction mechanism may engage with the sub notch, to restrict downward movement of the sub headrest stay (the headrest) (in the locked state).

Thus, when the headrest is at the lowest-level position, the downward movement of the headrest is restricted at the sub headrest stay side, as well as the main headrest stay side; therefore, there is no need to set the lowest-level position of the headrest, by bringing the lower surface of the headrest into abutting contact with the upper surface of the seat back, for example. Namely, with the above arrangement, a gap can be provided between the headrest and the seat back, at the lowest-level position of the headrest.

The headrest level adjustment mechanism as described above has an excellent effect that the downward movement of the sub headrest stay, as well as that of the main headrest stay, can be restricted by using the sub notch and the sub lock part, at the lowest-level position of the headrest.

In the headrest level adjustment mechanism as described above, the sub notch may be a recess defined by a part of a surface of the sub headrest stay in a direction perpendicular to a hanging direction of the sub headrest stay, and the sub lock part may be allowed to move into the sub notch. The part of the surface defining the recess may include a horizontal portion that may define an upper side of the recess such that an upper face of the sub lock part received in the recess may be allowed to be in plane contact with the horizontal portion, and an inclined portion that may be connected to the horizontal portion and be inclined toward the surface of the sub headrest stay other than the part of the surface defining the recess, when viewed in a direction toward a lower side of the recess.

In the headrest level adjustment mechanism as described above, the sub notch may be a recess defined by the part of the surface of the sub headrest stay in the direction perpendicular to the hanging direction of the sub headrest stay, and the sub lock part may be allowed to move into the recess.

Here, the part of the surface defining the recess may include the horizontal portion and the inclined portion, and the horizontal portion may define the upper side of the recess, and be allowed to be in plane contact with the upper face of the sub lock part received in the recess. In the condition where the upper face of the sub lock part is in contact (or plane contact) with the horizontal portion of the recess, the downward movement of the sub headrest stay (the headrest) in which the recess may be included is restricted (in the locked state).

On the other hand, the inclined portion may be connected to the horizontal portion, and be inclined toward the surface of the sub headrest stay other than the part of the surface defining the recess, when viewed in the direction toward the lower side of the recess. Thus, the inclined portion functions as a so-called cam face, and the force applied so as to lift the sub headrest stay can be converted into the force that moves the sub lock part outward from the recess. In this manner, the locked state established by the sub lock part is released.

Namely, with the above arrangement, the locked state of the sub lock part is maintained, and the headrest cannot be moved downward, at the lowest-level position of the headrest. However, the locked state of the sub lock part is released when the headrest is moved upward.

With the above arrangement, the headrest level adjustment mechanism has an excellent effect that the locked state of the sub headrest stay can be released, when the headrest is moved upward while it is in the locked state where the downward movement of the sub headrest stay is restricted.

In the headrest level adjustment mechanism as described above, the movement restriction mechanism may include a collar that may be provided on the sub headrest stay, and be configured to abut against the headrest and the sub support, to restrict downward movement of the sub headrest stay, at the lowest-level position of the headrest.

In the headrest level adjustment mechanism as described above, the movement restriction mechanism may include the color provided on the sub headrest stay. The color may abut against the headrest and the sub support, at the lowest-level position of the headrest, so as to restrict the downward movement of the sub headrest stay (the headrest) (in the locked state).

Namely, when the headrest is at the lowest-level position, the main lock part of the locking mechanism may engage with the main notch, to restrict the downward movement of the main headrest stay, and the collar may abut against the headrest and the sub support, to restrict the downward movement of the sub headrest stay.

With this arrangement, the headrest level adjustment mechanism has an excellent effect that the downward movement of the sub headrest stay can be restricted by using the collar, at the lowest-level position of the headrest.

In the headrest level adjustment mechanism as described above, the movement restriction mechanism may include a bent portion that may be included in the sub headrest stay, and be configured to interfere with the sub support to restrict downward movement of the sub headrest stay, at the lowest-level position of the headrest.

In the headrest level adjustment mechanism as described above, the movement restriction mechanism may include the bent portion included in the sub headrest stay. When the headrest is at the lowest-level position, the bent portion may interfere with the sub support, so as to restrict the downward movement of the sub headrest stay (the headrest) (in the locked state).

Namely, when the headrest is at the lowest-level position, the main lock part of the locking mechanism may engage with the main notch, to restrict the downward movement of the main headrest stay, and the bent portion included in the sub headrest stay may interfere with the sub support, to restrict the downward movement of the sub headrest stay.

With this arrangement, the headrest level adjustment mechanism has an excellent effect that the downward movement of the sub headrest stay can be restricted by the bending portion included in the sub headrest stay, at the lowest-level position of the headrest.

In the headrest level adjustment mechanism as described above, the movement restriction mechanism may include an expanded portion that may be included in the sub headrest stay, and be configured to interfere with the sub support to restrict downward movement of the sub headrest stay, at the lowest-level position of the headrest.

In the headrest level adjustment mechanism as described above, the movement restriction mechanism may include the expanded portion included in the sub headrest stay. When the headrest is at the lowest-level position, the expanded portion may interfere with the sub support, to restrict the downward movement of the sub headrest stay (the headrest) (in the locked state).

Namely, when the headrest is at the lowest-level position, the main lock part of the locking mechanism may engage with the main notch, to restrict the downward movement of the main headrest stay, and the expanded portion included in the sub headrest stay may interfere with the sub support, to restrict the downward movement of the sub headrest stay.

With this arrangement, the headrest level adjustment mechanism has an excellent effect that the downward movement of the sub headrest stay can be restricted by the expanded portion included in the sub headrest stay, at the lowest-level position of the headrest.

In the headrest level adjustment mechanism as described above, the movement restriction mechanism may include an expanded portion that may be provided on the sub headrest stay, and be configured to interfere with the sub support to restrict downward movement of the sub headrest stay, at the lowest-level position of the headrest.

In the headrest level adjustment mechanism as described above, the movement restriction mechanism may include the expanded portion provided on the sub headrest stay. When the headrest is at the lowest-level position, the expanded portion may interfere with the sub support, to restrict the downward movement of the sub headrest stay (the headrest) (in the locked state).

Namely, when the headrest is at the lowest-level position, the main lock part of the locking mechanism may engage with the main notch, to restrict the downward movement of the main headrest stay, and the expanded portion provided on the sub headrest stay may interfere with the sub support, to restrict the downward movement of the sub headrest stay.

With this arrangement, the headrest level adjustment mechanism has an excellent effect that the downward movement of the sub headrest stay can be restricted by the expanded portion provided on the sub headrest stay, at the lowest-level position of the headrest.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A headrest using a headrest level adjustment mechanism according to one embodiment will be described with reference to the drawings. In the drawings, arrow FR indicated as needed indicates the front direction (in which a seated person faces) of a vehicle seat, and arrow UP indicates the upward direction of the vehicle seat, while arrow RH indicates the right-hand direction of the vehicle seat. In the following description, when front and back directions, upward and downward directions, and right-hand and left-hand directions are simply mentioned, they indicate the front and back directions of the vehicle seat, upward and downward directions of the vehicle seat, and right-hand and left-hand directions of the vehicle seat when it faces in the traveling direction, respectively.

Configuration of Headrest Level Adjustment Mechanism

Initially, the configuration of the headrest level adjustment mechanism according to this embodiment will be described.

Figure 1:
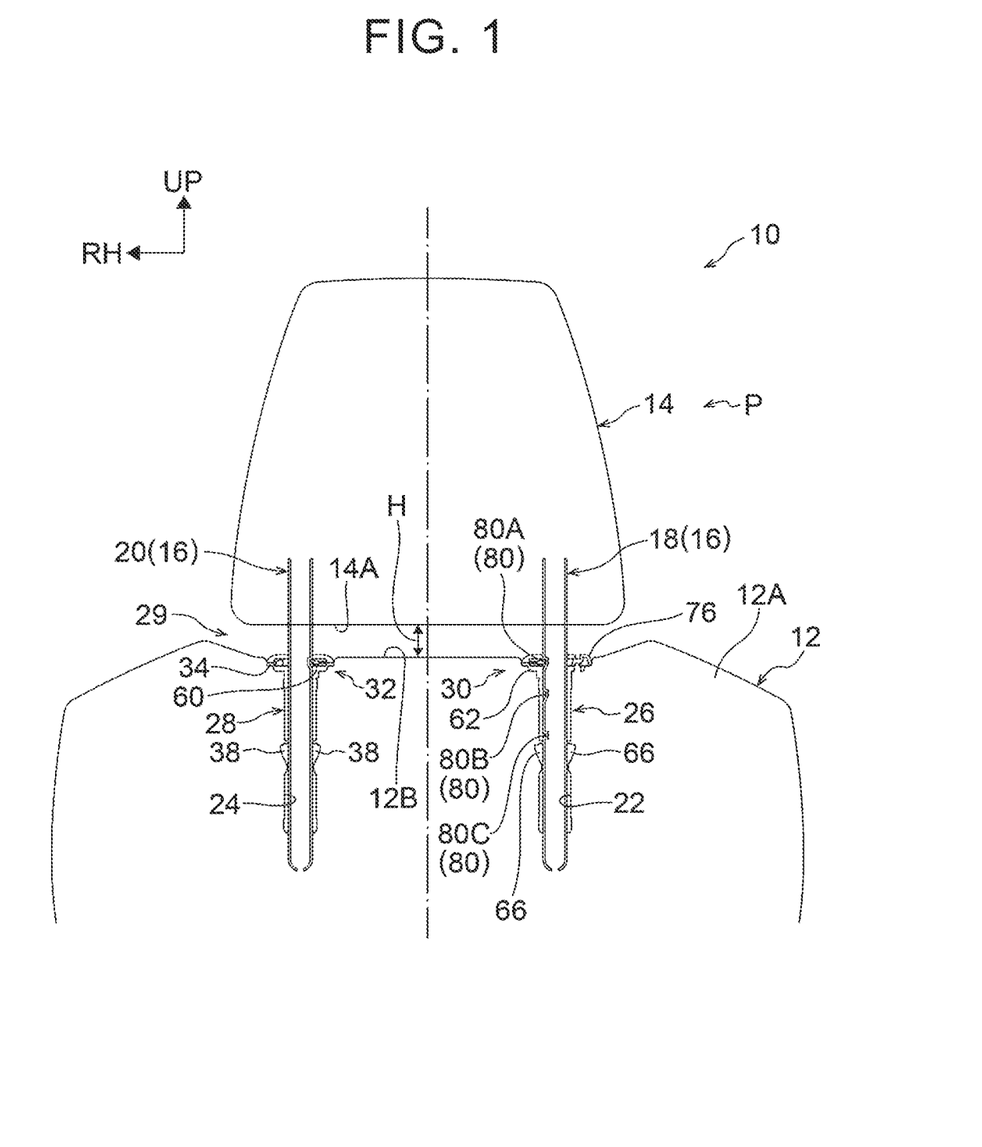
FIG. 1 is a cross-sectional view as seen from the front side, showing a headrest level adjustment mechanism of one embodiment.

As shown in FIG. 1, a vehicle seat 10 includes a seat cushion (not shown) on which a vehicle occupant is seated, a seat back 12 that is erected from a rear end portion of the seat cushion, and supports the upper body of the occupant seated on the seat cushion, and a headrest 14 that is attached to an upper end portion 12A of the seat back 12, and supports the head of the occupant seated on the seat cushion.

The headrest 14 is formed of foam, such as urethane foam, for example, such that the headrest 14 can be elastically deformed. Also, the headrest 14 has a trapezoidal shape in front view, and has a generally triangle shape in side view, and a pair of headrest stays 16 (legs) hang down from a lower surface 14A of the headrest 14, more specifically, from right and left positions of the headrest 14 that are spaced from each other in the seat width direction. In this embodiment, the headrest stays 16 are two cylindrical members. In this connection, the headrest stays 16 are only required to provide a pair of right and left legs, and thus may be in the form of a single member provided with legs connected to each other at their upper ends.

In the following description, one of the headrest stays 16 located on the outer side in the vehicle width direction will be called "main headrest stay 18", and the other located on the inner side in the vehicle width direction will be called "sub headrest stay 20". In this connection, the headrest stay 16 located on the inner side in the vehicle width direction may be "main headrest stay 18", and the headrest stay 16 located on the outer side in the vehicle width direction may be "sub headrest stay 20".

The main headrest stay 18 and the sub headrest stay 20 are held by the seat back 12. Like the headrest 14, the seat back 12 is formed of foam, such as urethane foam, and can be elastically deformed.

Also, insertion holes 22, 24 that extend in the vehicle vertical direction are respectively included in the upper portion of the seat back 12. Each of the insertion holes 22, 24 has a rectangular shape in plan view. A main support 26 in the form of a rectangular tube that serves as a support member for supporting the main headrest stay 18 is inserted in the insertion hole 22, and a sub support 28 in the form of a rectangular tube that serves as a support member for supporting the sub headrest stay 20 is inserted in the insertion hole 24.

In a condition where the main support 26 is inserted in the insertion hole 22, the main headrest stay 18 is inserted in the main support 26. In a condition where the sub support 28 is inserted in the insertion hole 24, the sub headrest stay 20 is inserted in the sub support 28.

In this embodiment, as a level adjustment mechanism 29 for the headrest 14, a locking mechanism 30 is provided on the main support 26 side, and a movement restriction mechanism 32 is provided on the sub support 28 side.

Here, the movement restriction mechanism 32 will be initially described, and the locking mechanism 30 will be then described, for the sake of expediency.

Movement Restriction Mechanism

As described above, the movement restriction mechanism 32 is provided on the sub support 28 side.

Figure 4:
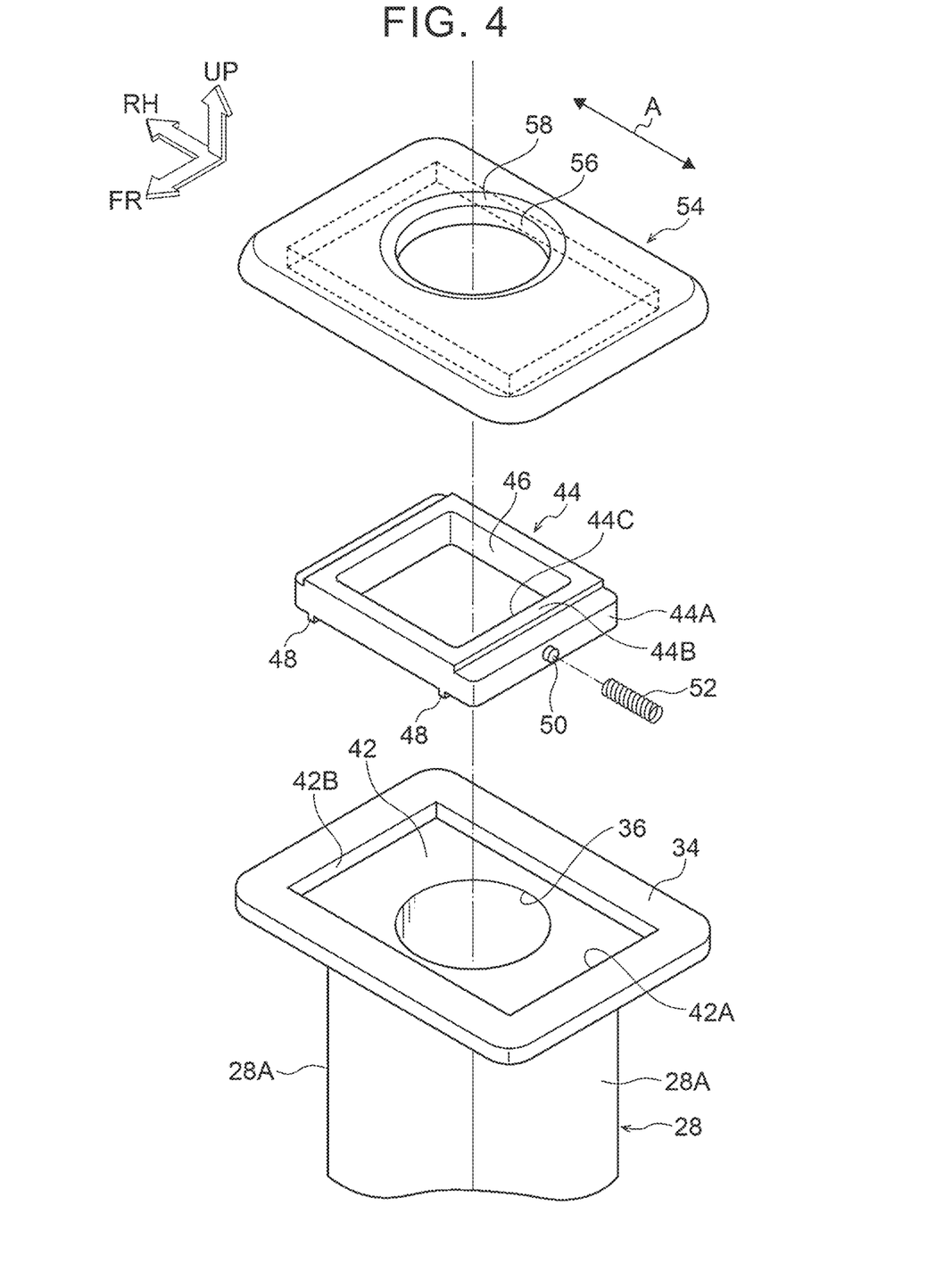
FIG. 4 is an exploded perspective view showing the headrest level adjustment mechanism of the embodiment.

As shown in FIG. 4, the sub support 28 is provided at its upper end with a flange 34 that extends outward from the sub support 28. The flange 34 is provided such that its longitudinal direction is in parallel with the seat width direction (indicated by arrow A). A round hole 36 that communicates with the interior of the sub support 28 in the form of the rectangular tube is included in a middle portion of the flange 34, and the shape of the round hole 36 corresponds to the shape of the cylindrical sub headrest stay 20.

Figure 2:
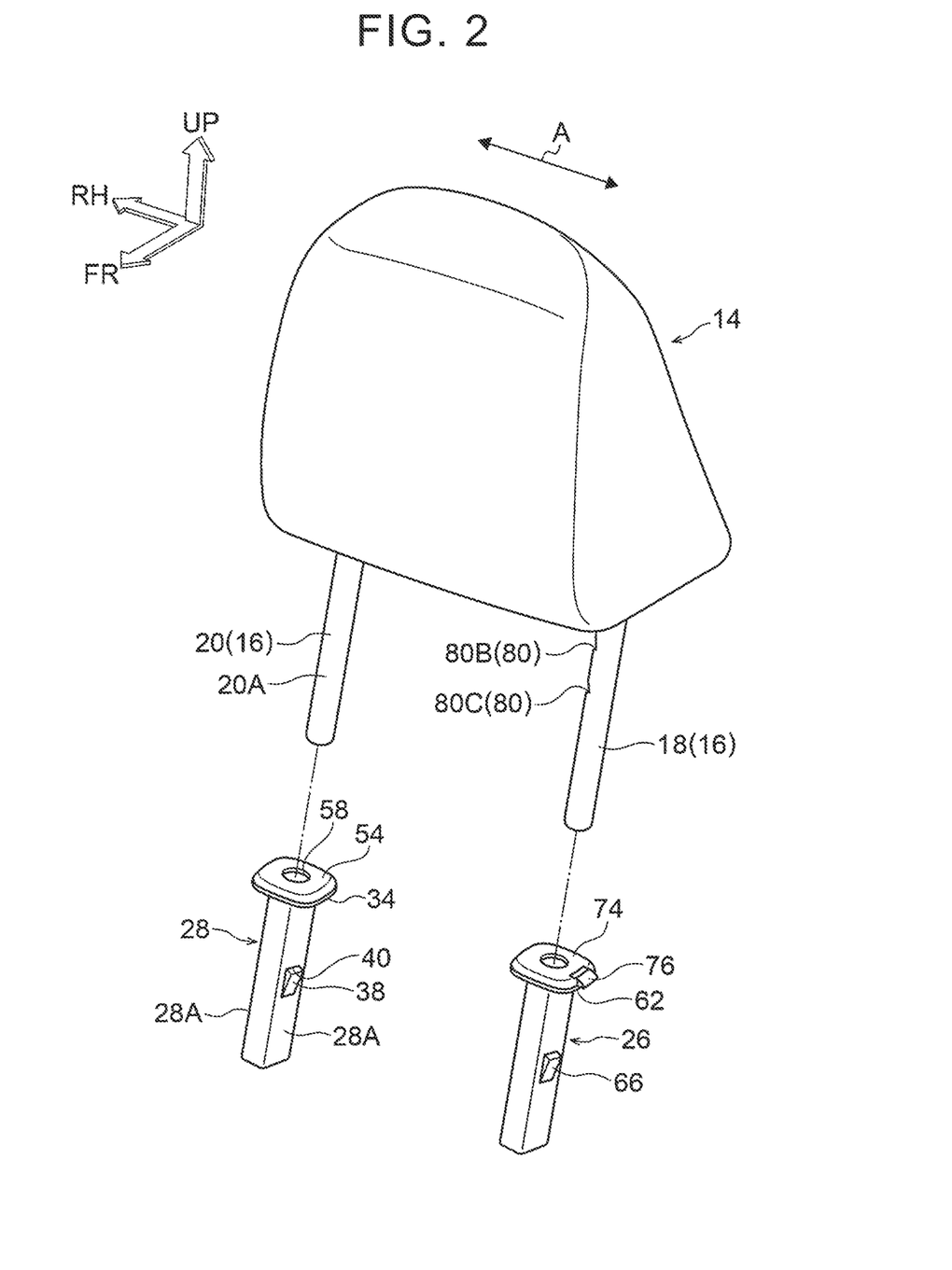
FIG. 2 is an exploded perspective view showing the headrest level adjustment mechanism of the embodiment.

As shown in FIG. 2, the sub support 28 has stops 38 respectively provided on generally middle portions (as viewed in the height direction of the sub support 28) of a pair of side walls 28A each extending in a direction perpendicular to the seat width direction (indicated by arrow A). A through-hole 40 having an inverted U shape that is open downward is provided around each of the stops 38, and the through-hole 40 permits the corresponding stop 38 to be elastically deformed toward the inside of the sub support 28.

On the other hand, engaging holes (not shown) that are recessed in the horizontal direction are provided within the insertion hole 24 in which the sub support 28 is inserted, as shown in FIG. 1. When the sub support 28 is inserted in the insertion hole 24, the stops 38 are elastically deformed inwardly of the sub support 28, and the sub support 28 can be moved to the deep side of the insertion hole 24. When the flange 34 of the sub support 28 abuts against an upper surface 12B of the seat back 12, and the stops 38 of the sub support 28 reach positions where they face the engagement holes, the stops 38 restore their shapes, and are engaged with hole walls of the engagement holes.

In this manner, the sub support 28 is prevented from being pulled out of the insertion hole 24 included in the upper portion of the seat back 12, and is mounted in the insertion hole 24.

Since the seat back 12 is elastically deformable, as described above, the position of the upper surface 12B of the seat back 12 differs depending on the pressing force. Also, the insertion hole 24 has a rectangular shape in plan view, and the sub support 28 is in the form of a rectangular tube. Namely, the sub support 28 is set so as not to rotate relative to the insertion hole 24.

As shown in FIG. 4, the flange 34 of the sub support 28 is provided with a rectangular stepped portion 42 that is recessed and has the longitudinal direction parallel to the seat width direction. A sub lock plate (sub lock part) 44 in the form of a rectangular frame having the longitudinal direction parallel to the seat width direction is housed in the stepped portion 42, and a rectangular hole 46 is included in a middle portion of the sub lock plate 44.

The longitudinal dimension of the sub lock plate 44 is set to be shorter than the longitudinal dimension of the stepped portion 42, and the sub lock plate 44 is movable in the longitudinal direction within the stepped portion 42.

Ribs 48 in the form of rectangular solids are included in the lower surface of the sub lock plate 44 to protrude therefrom, such that the ribs 48 located close to the rectangular hole 46 extend in the width direction perpendicular to the longitudinal direction of the sub lock plate 44. The ribs 48 are designed so as to reduce the area of contact between the sub lock plate 44 and the stepped portion 42, and reduce friction that arises when the sub lock plate 44 moves in the stepped portion 42.

Also, a solid cylindrical protrusion 50 protrudes from an outer side face 44A of the sub lock plate 44 as viewed in the longitudinal direction. One end portion of a coil spring 52 is attached to the protrusion 50. The other end portion of the coil spring 52 abuts against an inner wall 42A of the stepped portion 42 that is opposed to the protrusion 50, and the sub lock plate 44 is biased by the coil spring 52, toward an inner wall 42B of the stepped portion 42 that is opposed to the inner wall 42A.

Also, the sub lock plate 44 is designed so as to overlap a part of the round hole 36 included in the flange 34 of the sub support 28, in a condition where the sub lock plate 44 abuts against the inner wall 42B of the stepped portion 42. The flange 34 of the sub support 28 is provided with a support upper 54 that covers the flange 34.

The support upper 54 has substantially the same outside dimensions as the flange 34, and is provided with a stepped portion 56 and a round hole 58, like the flange 34. An upper portion of the sub lock plate 44 is housed in the stepped portion 56. The support upper 54 is joined by welding, or the like, to the flange 34 of the sub support 28, in a condition where the sub lock plate 44 and the coil spring 52 are housed in the stepped portion 56.

Figure 3:
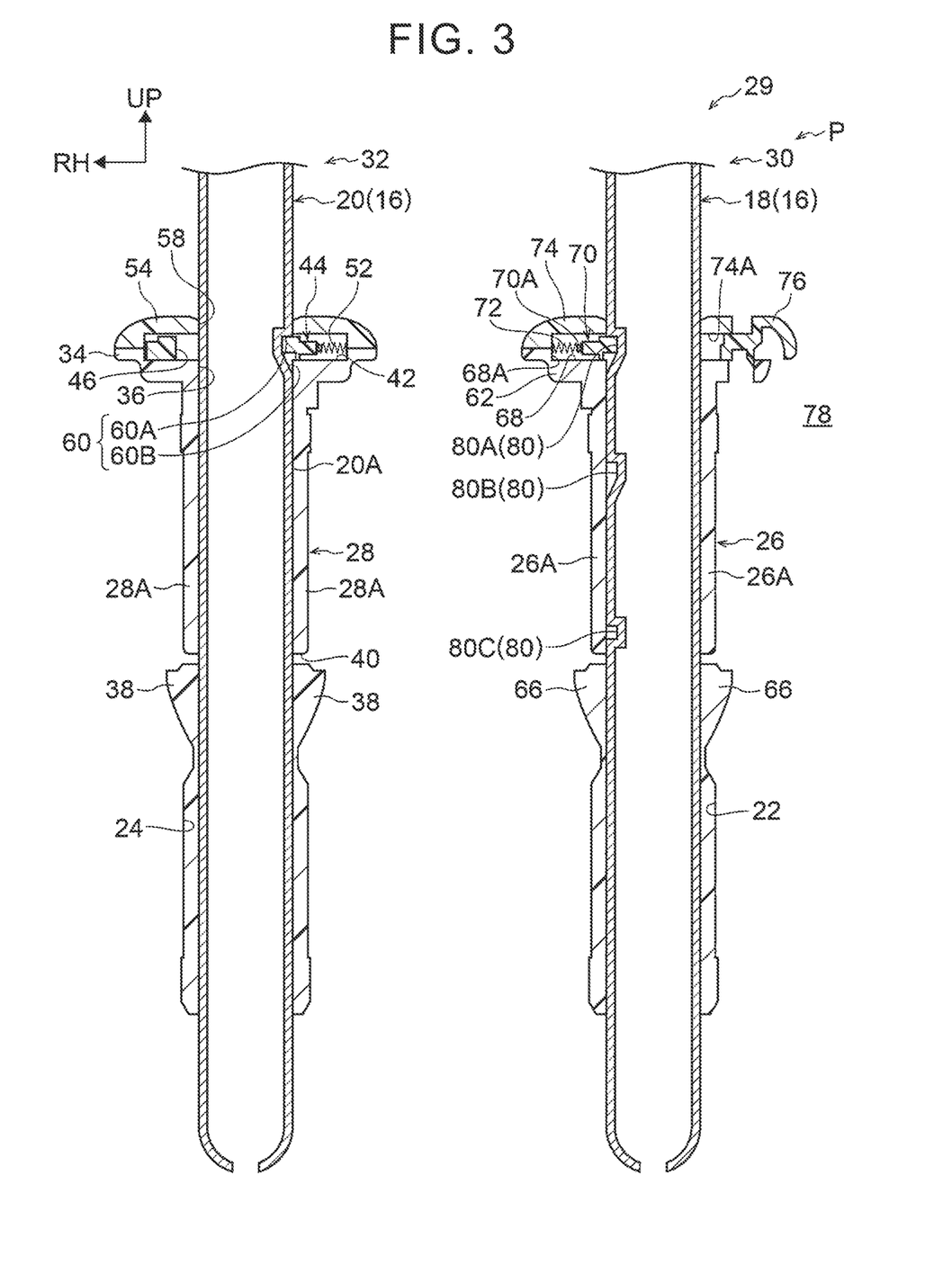
FIG. 3 is an enlarged cross-sectional view showing a principal part of the headrest level adjustment mechanism of the embodiment shown in FIG. 1.

On the other hand, as shown in FIG. 1 and FIG. 3, the sub headrest stay 20 is provided with one sub notch 60 (a notch for the lowest level that will be described later) as a recessed portion that is recessed in a radial direction (perpendicular to the hanging direction of the sub headrest stay 20) of the sub headrest stay 20. The sub notch 60 is provided on one side on which the coil spring 52 is provided on the sub lock plate 44, and the sub lock plate 44 can move into (engage with) the sub notch 60.

As shown in FIG. 3 and FIG. 4, in a condition where the sub headrest stay 20 is inserted in the sub support 28, the sub headrest stay 20 is inserted through the round hole 58 of the support upper 54, the rectangular hole 46 of the sub lock plate 44, and the round hole 36 of the flange 34.

In this condition, the sub lock plate 44 is biased by the coil spring 52, toward the inner wall 42B of the stepped portion 42, as described above. The sub lock plate 44 overlaps the round hole 36, in a condition where the sub lock plate 44 abuts against the inner wall 42B of the stepped portion 42. Namely, the sub lock plate 44 partially protrudes over the round hole 36.

Thus, in the condition where the sub headrest stay 20 is inserted in the sub support 28, the coil spring 52 is contracted by the sub headrest stay 20, and the inner wall 44C of the sub lock plate 44 closer to the coil spring 52 abuts against a surface 20A of the sub headrest stay 20, under the bias force of the coil spring 52.

The sub notch 60 is recessed in the radial direction of the sub headrest stay 20, as described above, and includes a horizontal portion 60A and an inclined portion 60B. With this arrangement, when the sub notch 60 of the sub headrest stay 20 is opposed to the sub lock plate 44, the sub lock plate 44 moves into the sub notch 60 under the bias force of the coil spring 52. Thus, since the sub lock plate 44 is biased by the coil spring 52 toward the sub notch 60, the sub lock plate 44 is kept in a condition where it is received in the sub notch 60.

The horizontal portion 60A defines the upper side of the sub notch 60, and an upper face 44B of the sub lock plate 44 moved into the sub notch 60 abuts against the horizontal portion 60A, such that the upper face 44B and the horizontal portion 60A can be in plan contact with each other. Namely, in a condition where the sub lock plate 44 is received in the sub notch 60, and the upper face 44B of the sub lock plate 44 is in contact or plane contact with the horizontal portion 60A of the sub notch 60, downward movement of the sub headrest stay 20 (the headrest 14) is restricted, and the sub headrest stay 20 (the headrest 14) is placed in a so-called locked state.

On the other hand, the inclined portion 60B is connected to the horizontal portion 60A, and is inclined toward the surface 20A of the sub headrest stay 20 other than the part of the surface 20A defining the recess, when viewed in a direction toward the lower side of the sub notch 60. Thus, the force applied so as to elevate the sub headrest stay 20 can be converted into the force that moves the sub lock plate 44 from the inside of the sub notch 60 to the outside. In this manner, the locked state established by the sub lock plate 44 is released.

At this time, the coil spring 52 is contracted in a direction against the bias force; therefore, when the surface 20A of the sub headrest stay 20 reaches a position where it is opposed to the inner wall 44C of the sub lock plate 44, the inner wall 44C of the sub lock plate 44 abuts against the surface 20A of the sub headrest stay 20, under the bias force of the coil spring 52.

Locking Mechanism

Next, the locking mechanism 30 will be described. In the locking mechanism 30, the same names are given to its constituent members that are substantially identical with those of the movement restriction mechanism 32, and the constituent members will not be repeatedly described.

As described above, the locking mechanism 30 is provided on the main support 26 side. As shown in FIG. 1 and FIG. 3, a flange 62 is provided at the upper end of the main support 26. Also, stops 66 are respectively provided on a pair of opposite side walls 26A of the main support 26, and the stops 66 are engaged with hole walls of engaging holes (not shown) included in the insertion hole 22. With this arrangement, like the sub support 28, the main support 26 is prevented from being pulled out of the insertion hole 22 included in the upper portion of the seat back 12, and is mounted in the insertion hole 22.

Like the sub support 28, a stepped portion 68 in the form of a recess is included in the flange 62 of the main support 26, and a main lock plate (a main lock part) 70 in the form of a generally rectangular frame is housed in the stepped portion 68. The main lock plate 70 is movable in its longitudinal direction within the stepped portion 68.

A coil spring 72 is mounted on a longitudinally outer side face 70A of the main lock plate 70, and the main lock plate 70 is biased by the coil spring 72, away from an inner wall 68A of the stepped portion 68 that is opposed to the side face 70A.

Like the sub support 28, the flange 62 of the main support 26 is provided with a support upper 74 that covers the flange 62, and the main lock plate 70 and the coil spring 72 are housed in space between the support upper 74 and the flange 62.

Also, the support upper 74 is provided with an opening 74A. The main lock plate 70 is provided with an unlocking knob 76 on the side opposite to the side face 70A, and the unlocking knob 76 is set to be exposed to the interior of a vehicle cabin 78, through the opening 74A. When the unlocking knob 76 is moved in the horizontal direction, the main lock plate 70 is moved in the stepped portion 68.

On the other hand, the main headrest stay 18 is provide with a plurality of (three in this embodiment) main notches 80 that are recessed in a radial direction of the main headrest stay 18, and are arranged in its hanging direction (in the height direction of the headrest 14). The main lock plate 70 can move into any of the main notches 80.

In this embodiment, the main notches 80 are provided as three notches 80A, 80B, 80C. The headrest 14 is located at the lowest level, in a condition where the main lock plate 70 is received in the notch 80A provided closest to the headrest 14, in the main headrest stay 18. Thus, the notch 80A is denoted as a notch for the lowest level. In the following description, the "notch 80A" will be called "notch 80A for lowest level".

Also, the headrest 14 is placed at the highest level, in a condition where the main lock plate 70 is received in the notch 80C provided at a position (closer to the distal end) remotest from the headrest 14, in the main headrest stay 18. Thus, the notch 80C is denoted as a notch for the highest level. In the following description, the "notch 80C" will be called "notch 80C for highest level".

Then, the notch 80B provided between the notch 80A for lowest level and the notch 80C for highest level will be called "notch 80B for middle level". In a condition where the main lock plate 70 is received in the notch 80B for middle level, the headrest 14 is placed at a level (middle-level position of the headrest 14) intermediate between the highest-level position of the headrest 14 at which the headrest 14 is at the highest level, and the lowest-level position of the headrest 14 at which the headrest 14 is at the lowest level.

In the evaluation of the capability of reducing whiplash injuries, which is carried out according to the European New Car Assessment Programme (E-NCAP), the middle-level position and lowest-level position of the headrest 14 are specified. Thus, the levels of the headrest 14 required at the middle-level position and the lowest-level position P of the headrest 14 need to be ensured.

The main notches 80 are recessed in the radial direction of the main headrest stay 18. Like the sub notch 60 included in the sub headrest stay 20, when any of the main notches 80 is opposed to the main lock plate 70, the main lock plate 70 moves into the main notch 80 under the bias force of the coil spring 72.

Thus, since the main lock plate 70 is biased by the coil spring 72 toward one of the main notches 80, the main lock plate 70 is kept received in the one of the notch 80A for lowest level, notch 80B for middle level, and notch 80C for highest level. With this arrangement, the level of the headrest 14 can be adjusted, and the headrest 14 is kept at the level thus adjusted.

In this embodiment, the notch 80A for lowest level and the notch 80B for middle level have substantially the same shape as the sub notch 60 included in the sub headrest stay 20. Namely, each of the notch 80A and notch 80B includes a horizontal portion and an inclined portion. Thus, when the main headrest stay 18 (the headrest 14) is moved upward, in a condition where the main lock plate 70 is received in the notch 80A for lowest level or the notch 80B for middle level, the locked state established by the main lock plate 70 is released.

On the other hand, the notch 80C for the highest level is not provided with any inclined portion. Namely, the notch 80C has upper and lower horizontal portions that are opposed to each other. With this arrangement, in a condition where the main lock plate 70 is received in the notch 80C for highest level, the locked state established by the main lock plate 70 cannot be released, even with an attempt to move the main headrest stay 18 upward.

Accordingly, in the condition where the main lock plate 70 is received in the notch 80C for highest level, namely, when the headrest 14 is at the highest-level position, the locked state established by the main lock plate 70 is released by moving the main lock plate 70 by means of the unlocking knob 76.

Operation and Effects of the Headrest Level Adjustment Mechanism

Next, the operation and effects of the headrest level adjustment mechanism according to this embodiment will be described.

As shown in FIG. 1 to FIG. 3, in this embodiment, the level adjustment mechanism 29 for the headrest 14 includes the main support 26 and the sub support 28, and the main support 26 is provided on the main headrest stay 18 side, and includes the locking mechanism 30 that can adjust the level of the headrest 14 and lock the headrest 14 at a given level. On the other hand, the sub support 28 is provided on the sub headrest stay 20 side, and includes the movement restriction mechanism 32 that restricts the downward movement of the headrest 14.

More specifically, in this embodiment, the locking mechanism 30 includes the main notches 80 and the main lock plate 70. The main notches 80 are included in the main headrest stay 18, and are arranged in the height direction of the headrest 14.

Also, the main lock plate 70 is provided in the main support 26. When the main lock plate 70 is engaged with one of the main notches 80 included in the main headrest stay 18, the upward and downward movement of the main headrest stay 18 (the headrest 14) is restricted (in the locked state). Namely, in this embodiment, the upward and downward movement of the main headrest stay 18 can be restricted with a simple arrangement.

In this embodiment, the main headrest stay 18 is provided with the main notches 80, and the main lock plate 70 is engaged with one of the main notches 80, so that the movement of the main headrest stay 18 is restricted at given positions with a simple arrangement. However, the arrangement is not limited to this one, provided that the movement of the main headrest stay 18 can be restricted at given positions.

On the other hand, the movement restriction mechanism 32 includes the sub notch 60 and the sub lock plate 44. The sub notch 60 is included in the sub headrest stay 20 at the same level as the notch 80A for lowest level located closest to the headrest 14, as one of the main notches 80.

Also, the sub lock plate 44 is provided in the sub support 28, and is engaged with the sub notch 60, so as to restrict the downward movement of the sub headrest stay 20 (the headrest 14) (i.e., place it in the locked state).

Namely, in this embodiment, at the lowest-level position P of the headrest 14, the main lock plate 70 on the locking mechanism 30 side engages with one of the main notches 80, so as to restrict the downward movement of the main headrest stay 18, and the sub lock plate 44 on the movement restriction mechanism 32 side engages with the sub notch 60, so as to restrict the downward movement of the sub headrest stay 20 (i.e., place it in the locked state).

Thus, at the lowest-level position P of the headrest 14, the downward movement of the headrest 14 is restricted, not only on the main headrest stay 18 side, but also on the sub headrest stay 20 side. Thus, in this embodiment, the downward movement of the headrest 14 can be more reliably curbed, as compared with the case where the downward movement of the headrest 14 is restricted only on the main headrest stay 18 side.

Figure 5A:
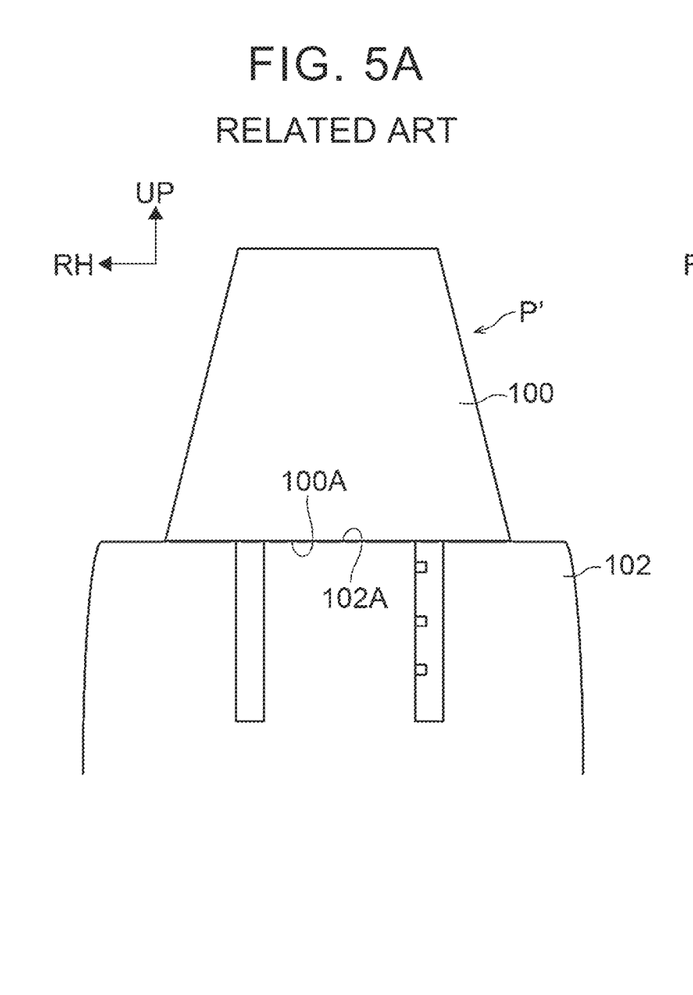
FIG. 5A is a cross-sectional view as seen from the front side, showing a headrest level adjustment mechanism as a comparative example.
Figure 5B:
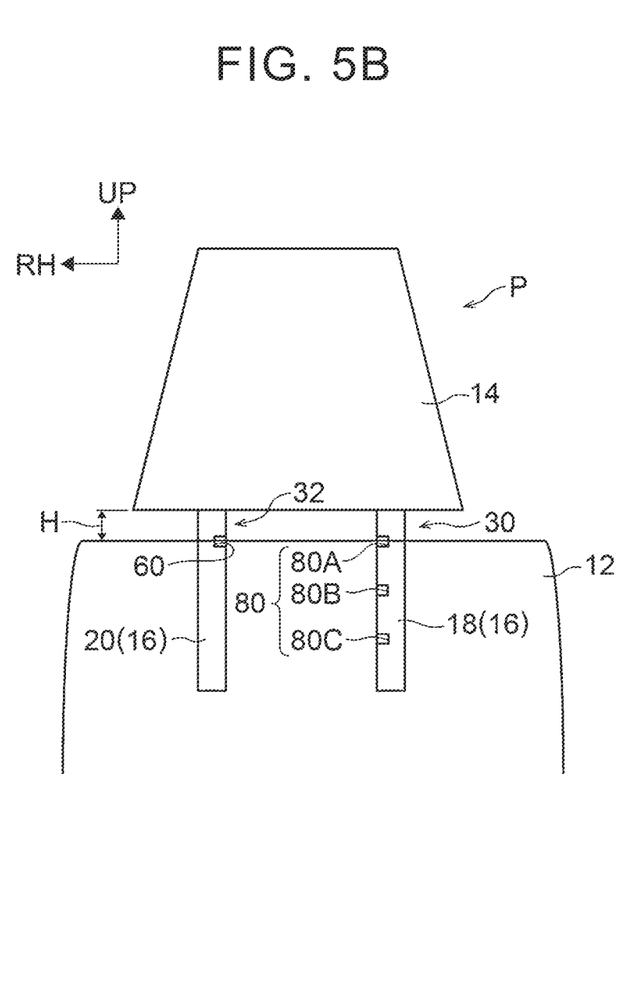
FIG. 5B is a cross-sectional view as seen from the front side, showing the headrest level adjustment mechanism of the embodiment.

Thus, in this embodiment, it is not necessary to set the lowest-level position P' of a headrest 100, by bringing a lower surface 100A of the headrest 100 into abutting contact with an upper surface 102A of a seat back 102, as shown in FIG. 5A, as a comparative example. As a result, in this embodiment, a gap H can be provided between the headrest 14 and the seat back 12, as shown in FIG. 5B.

As described above, the movement restriction mechanism 32 maintains the lowest-level position of the headrest 14 by restricting the downward movement of the headrest 14 (namely, placing it in the locked state) in a condition where the gap H is provided between the headrest 14 and the seat back 12, at the lowest-level position P at which the headrest 14 is at the lowest level in a condition where the main headrest stay 18 is engaged with the main support 26.

Thus, in this embodiment, where the lowest-level position P of the headrest 14 is equal, the size of the headrest 14 can be reduced in the height direction by the amount corresponding to the gap H, as compared with the case where no gap is provided between the headrest 100 and the seat back 102, as shown in FIG. 5A, as the comparative example. Namely, in this embodiment, it is possible to reduce the size of the headrest 14, while assuring the level of the headrest 14 that is required at the lowest-level position P of the headrest 14.

In the meantime, according to the European New Car Assessment Programme (E-NCAP), the middle-level position and lowest-level position of the headrest are specified. The middle-level position of the headrest is set to be within ±10 mm from a middle point of the lowest-level position of the headrest and the highest-level position of the headrest.

As described above, the headrest 14 can be elastically deformed; therefore, variations in dimensions appear due to elastic deformation of the headrest 14 itself. Thus, when the lowest-level position P' of the headrest 100 is set to the position at which the lower surface 100A of the headrest 100 is in abutting contact with the upper surface 102A of the seat back 102, as in the comparative example shown in FIG. 5A, there arises a need to take account of a variation in dimension due to elastic deformation of the headrest 100.

Figure 6:
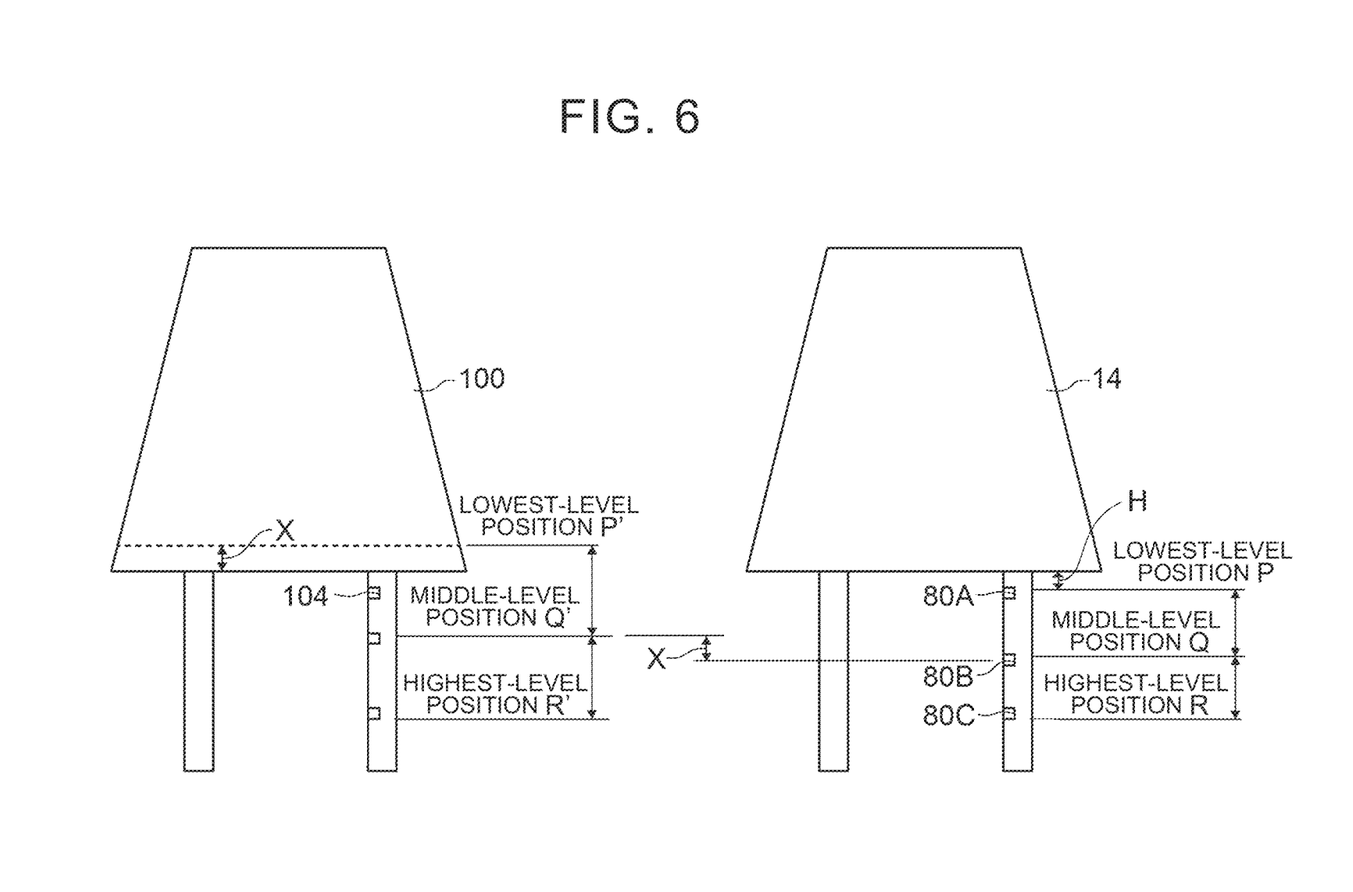
FIG. 6 is a front view useful for describing the operation of the headrest level adjustment mechanism of the embodiment.

As a result, as shown in FIG. 6, the lowest-level position P' of the headrest 100 is set to the upper side of a notch 104 for lowest level, in view of a variation X in dimension due to elastic deformation of the headrest 100, and a middle-level position Q' of the headrest 100 is set between the lowest-level position P' of the headrest 100 and the highest-level position R' of the headrest 100.

On the other hand, in this embodiment, the gap H is provided between the headrest 14 and the seat back 12; therefore, there is no need to take account of a variation in dimension due to elastic deformation of the headrest 14 itself. Accordingly, the lowest-level position P of the headrest 14 is set to the position of the notch 80A for lowest level, and the middle-level position Q of the headrest 14 is set between the notch 80A for lowest level and the notch 80C for highest level.

Namely, in this embodiment, the level of the headrest 14 at the middle-level position Q is higher than that of the comparative example. Accordingly, in this embodiment, the upper portion of the headrest 14 can be cut, by an amount corresponding to a rise of the level of the headrest 14 from that of the comparative example, and, consequently, the size of the headrest 14 can be reduced.

In this embodiment, as the size of the headrest 14 is reduced, a feeling of pressure in the vehicle cabin 78, which would arise due to a large size of the headrest 14, is reduced, and the field of front view of an occupant on the rear seat can be broadened as compared with the case where the headrest 14 is large in size.

Also, in this embodiment, as shown in FIG. 1 to FIG. 3, the sub notch 60 is a recess where the surface 20A of the sub headrest stay 20 is recessed in a direction perpendicular to the hanging direction of the sub headrest stay 20, and the sub lock plate 44 can move into the sub notch 60.

Also, the sub notch 60 includes the horizontal portion 60A and the inclined portion 60B, and the horizontal portion 60A defines the upper side of the sub notch 60, such that the upper face 44B of the sub lock plate 44 received in the sub notch 60 abuts against the horizontal portion 60A for plane contact therewith. In a condition where the upper face 44B of the sub lock plate 44 is in contact or plane contact with the horizontal portion 60A of the sub notch 60, the downward movement of the sub headrest stay 20 in which the sub notch 60 is included is restricted (in the locked state).

On the other hand, the inclined portion 60B is connected to the horizontal portion 60A, and is inclined toward the surface 20A of the sub headrest stay 20 other than the part of the surface 20A defining the recess, when viewed in a direction toward the lower side of the sub notch 60. Thus, the inclined portion 60B functions as a so-called cam face, and can convert the force applied so as to lift the sub headrest stay 20 into the force that moves the sub lock plate 44 outward from the inside of the sub notch 60. In this manner, the locked state established by the sub lock plate 44 is released.

Namely, in this embodiment, at the lowest-level position P of the headrest 14, the locked state established by the sub lock plate 44 is maintained, and the headrest 14 cannot be moved downward. However, when the headrest 14 is moved upward, the locked state of the sub lock plate 44 is released.

Modified Examples of the Embodiment

In the above embodiment, the movement restriction mechanism 32 has the sub notch 60 included in the surface 20A of the sub headrest stay 20, as shown in FIG. 1, and is arranged to restrict the downward movement of the sub headrest stay 20 when the sub lock plate 44 moves into (engages with) the sub notch 60.

However, the movement restriction mechanism is not limited to the above arrangement, provided that the downward movement of the headrest 14 is restricted on the sub headrest stay 20 side, as well as the main headrest stay 18 side, in the condition where the gap H is provided between the headrest 14 and the seat back 12, at the lowest-level position P of the headrest 14.

Figure 7:
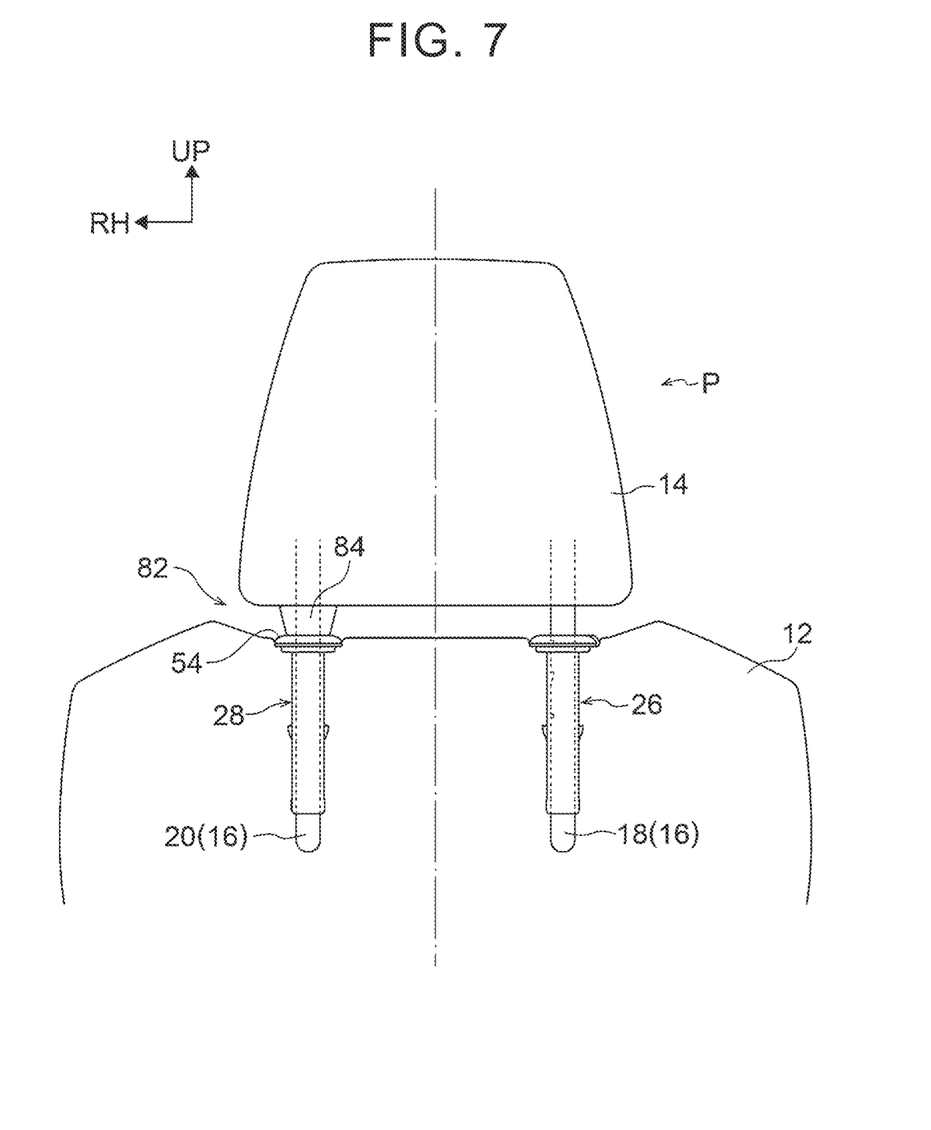
FIG. 7 is a cross-sectional view as seen from the front side, showing a first modified example of the headrest level adjustment mechanism of the embodiment.

For example, as a first modified example, a movement restriction mechanism 82 includes a collar 84 provided on the sub headrest stay 20, as shown in FIG. 7. The collar 84 is in the shape of a truncated cone of which the lower face has the smaller diameter, and the sub headrest stay 20 is inserted through the collar 84. Then, at the lowest-level position P of the headrest 14, the collar 84 may abut against the headrest 14 and the support upper 54 of the sub support 28, so as to restrict the downward movement of the sub headrest stay 20 (the headrest 14).

Figure 8A:
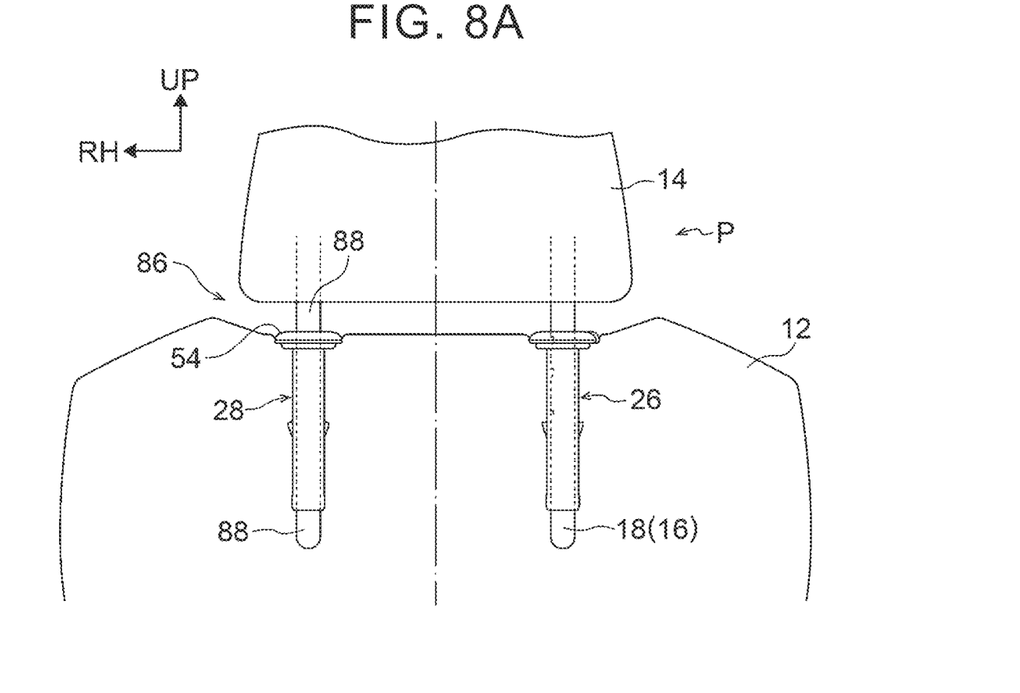
FIG. 8A is a cross-sectional view as seen from the front side, showing a second modified example of the headrest level adjustment mechanism of the embodiment.
Figure 8B:
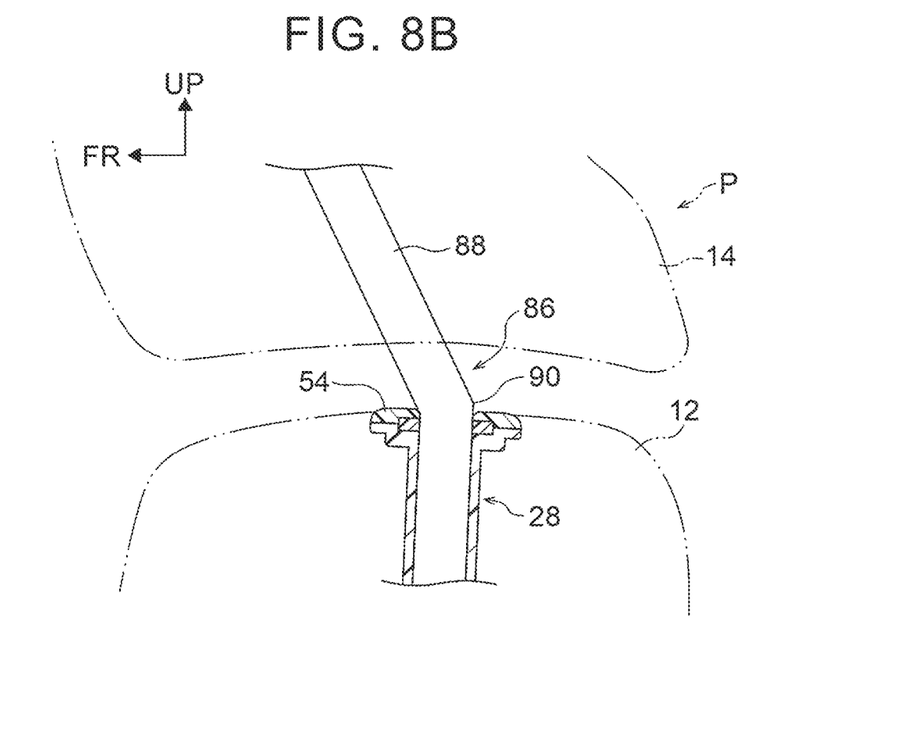
FIG. 8B is a cross-sectional view as seen from one side, showing the second modified example of the headrest level adjustment mechanism of the embodiment.

Also, as a second modified example, a movement restriction mechanism 86 includes a bent portion 90 included in a sub headrest stay 88, as shown in FIG. 8A and FIG. 8B. The bent portion 90 may interfere with the support upper 54 of the sub support 28, at the lowest-level position P of the headrest 14, so as to restrict the downward movement of the sub headrest stay 88 (the headrest 14).

Figure 9:
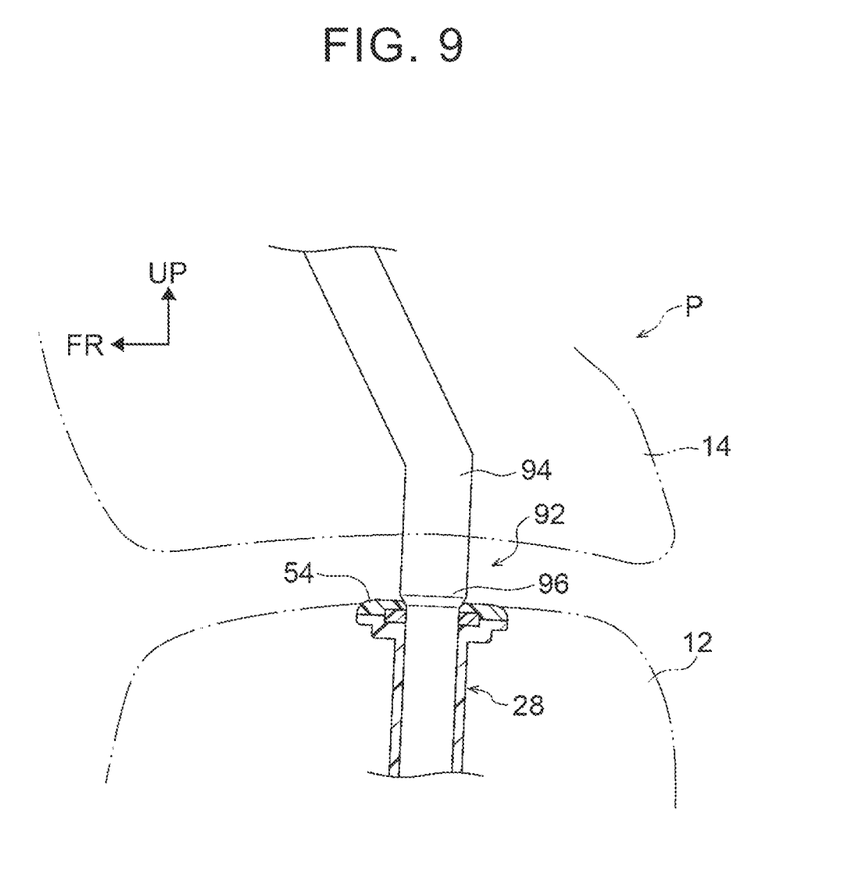
FIG. 9 is a cross-sectional view as seen from one side, showing a third modified example of the headrest level adjustment mechanism of the embodiment.

Further, as a third modified example, a movement restriction mechanism 92 includes an expanded portion 96 included in a sub headrest stay 94, as shown in FIG. 9. The expanded portion 96 may interfere with the sub support 28, at the lowest-level position P of the headrest 14, so as to restrict the downward movement of the sub headrest stay 94 (the headrest 14).

While the expanded portion 96 may be included in a sub headrest stay 94 by altering the shape of the sub headrest stay 94 itself, the expanded portion 96 may also be provided by mounting another member to the sub headrest stay 94, for example.

Although not illustrated in the drawings, a sub support may be provided with a back wall, and a distal end of a sub headrest stay may abut against the back wall, at the lowest-level position P of the headrest 14, so that the downward movement of the sub headrest stay is restricted.

While one embodiment of the present disclosure has been described above, the present disclosure is not limited to the above embodiment, but may be carried out with various modifications other than those as described above, without departing from its principle.

What is claimed is:

1. A headrest level adjustment mechanism for a headrest, comprising:
   a main support that is provided on a side of a main headrest stay, and cooperates with the main headrest stay to provide a locking mechanism operable to adjust a level of the headrest provided above a seat back and lock the headrest at a predetermined level, the main headrest stay being held by the seat back and hanging down from a first position of the headrest; and
   a sub support that is provided on a side of a sub headrest stay, and cooperates with the sub headrest stay to provide a movement restriction mechanism operable to restrict downward movement of the headrest and keep the headrest at a lowest-level position at which the headrest is located at a lowest level, in a condition where the main headrest stay is engaged with the main support, and a gap is provided between the headrest and the seat back, the sub headrest stay being held by the seat back and hanging down from a second position of the headrest that is spaced from the first position in a seat width direction,
   the locking mechanism includes a plurality of main notches included in the main headrest stay and arranged in a hanging direction of the main headrest stay,
   the plurality of main notches includes
      a main notch for the lowest-level position, the main notch being configured to set the headrest at the lowest-level position, and
      one or more main notches located below the main notch for the lowest-level position in the hanging direction of the main headrest stay, the movement restriction mechanism includes a sub notch portion included in the sub headrest stay, the sub notch portion includes a sub notch for the lowest-level position at a same level as the main notch for the lowest-level position, and the sub notch portion does not include a sub notch below the sub notch for the lowest-level position in a hanging direction of the sub headrest stay.

2. The headrest level adjustment mechanism according to claim 1, wherein the locking mechanism further includes a main lock part provided in the main support and configured to engage with one of the plurality of main notches to restrict upward and downward movement of the main headrest stay.

3. The headrest level adjustment mechanism according to claim 2, wherein:

the movement restriction mechanism further includes a sub lock part provided in the sub support and configured to engage with the sub notch to restrict downward movement of the sub headrest stay.

4. The headrest level adjustment mechanism according to claim 3, wherein:

the sub notch is a recess defined by a part of a surface of the sub headrest stay in a direction perpendicular to the hanging direction of the sub headrest stay, the sub lock part being allowed to move into the sub notch; and the part of the surface defining the recess includes a horizontal portion that defines an upper side of the recess such that an upper face of the sub lock part received in the recess is allowed to be in plane contact with the horizontal portion, and an inclined portion that is connected to the horizontal portion and is inclined toward the surface of the sub headrest stay other than the part of the surface defining the recess, when viewed in a direction toward a lower side of the recess.

5. The headrest level adjustment mechanism according to claim 2, wherein the movement restriction mechanism includes an expanded portion that is provided on the sub headrest stay, and is configured to interfere with the sub support to restrict downward movement of the sub headrest stay, at the lowest-level position of the headrest.

6. The headrest level adjustment mechanism according to claim 1, wherein the movement restriction mechanism includes a collar that is provided on the sub headrest stay, and is configured to abut against the headrest and the sub support, to restrict downward movement of the sub headrest stay, at the lowest-level position of the headrest.

7. The headrest level adjustment mechanism according to claim 1, wherein the movement restriction mechanism includes a bent portion that is included in the sub headrest stay, and is configured to interfere with the sub support to restrict downward movement of the sub headrest stay, at the lowest-level position of the headrest.

8. The headrest level adjustment mechanism according to claim 1, wherein the movement restriction mechanism includes an expanded portion that is included in the sub headrest stay, and is configured to interfere with the sub support to restrict downward movement of the sub headrest stay, at the lowest-level position of the headrest.

9. The headrest level adjustment mechanism according to claim 1, wherein the sub notch for the lowest-level position is a lowest notch of the movement restriction mechanism in the hanging direction of the sub headrest stay, the lowest notch being at the same level as the main notch for the lowest-level position.

* * * * *